(12) United States Patent
Clark et al.

(10) Patent No.: US 11,921,765 B2
(45) Date of Patent: Mar. 5, 2024

(54) SYSTEMATIC ITERATIVE ANALYSIS OF UNSTRUCTURED DATA FILES

(71) Applicant: Red Hat, Inc., Raleigh, NC (US)

(72) Inventors: Michael M. Clark, Raleigh, NC (US); Jesse H. Jaggars, Raleigh, NC (US); Christopher W. Sams, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 812 days.

(21) Appl. No.: 15/441,651

(22) Filed: Feb. 24, 2017

(65) Prior Publication Data
US 2018/0246956 A1   Aug. 30, 2018

(51) Int. Cl.
*G06F 16/338* (2019.01)
*G06F 16/13* (2019.01)
*G06F 16/31* (2019.01)
*G06F 16/35* (2019.01)

(52) U.S. Cl.
CPC ............ *G06F 16/338* (2019.01); *G06F 16/13* (2019.01); *G06F 16/316* (2019.01); *G06F 16/355* (2019.01)

(58) Field of Classification Search
CPC .............................. G06F 16/338; G06F 16/316
See application file for complete search history.

(56) References Cited

U.S. PATENT DOCUMENTS

| | | | |
|---|---|---|---|
| 7,849,048 B2 | 12/2010 | Langseth et al. | |
| 8,266,148 B2 * | 9/2012 | Guha | G06F 17/30867 |
| | | | 707/737 |
| 8,321,398 B2 | 11/2012 | Aumann et al. | |
| 8,863,301 B2 | 10/2014 | Agrawal et al. | |
| 9,251,180 B2 | 2/2016 | Deshpande et al. | |
| 9,323,767 B2 | 4/2016 | Blanchflower et al. | |
| 9,507,848 B1 * | 11/2016 | Li | G06F 16/81 |
| 2004/0167912 A1 * | 8/2004 | Tsui | G06F 16/958 |
| 2005/0257086 A1 * | 11/2005 | Triou | G06F 11/3688 |
| | | | 714/25 |
| 2009/0044024 A1 * | 2/2009 | Oberheide | G06F 21/562 |
| | | | 713/188 |
| 2010/0114899 A1 * | 5/2010 | Guha | G06F 16/9535 |
| | | | 707/E17.089 |
| 2010/0161616 A1 | 6/2010 | Mitchell | |
| 2013/0144863 A1 | 6/2013 | Mayer et al. | |

(Continued)

OTHER PUBLICATIONS

Chu, Eric et al., "A Relational Approach to Incrementally Extracting and Querying Structure in Unstructured Data," Proceedings of the 33rd International Conference on Very Large Date Bases, VLDB '07, Sep. 23-28, 2007, Vienna, Austria, ACM, 12 pages.

(Continued)

*Primary Examiner* — Brittany N Allen
(74) *Attorney, Agent, or Firm* — Dority & Manning, P.A.

(57) ABSTRACT

Mechanisms for the systematic iterative analysis of unstructured data files are disclosed. A first handler is initiated to analyze a plurality of files. Information about each respective file of the plurality of files analyzed by the first handler is stored in a data structure. The information includes a file identifier that identifies the respective file, a handler identifier that identifies the first handler, and results or a reference to results of an analysis of the respective file by the first handler.

12 Claims, 5 Drawing Sheets

(56) References Cited

U.S. PATENT DOCUMENTS

2016/0292592 A1* 10/2016 Patthak ............... G06F 16/2228
2016/0335260 A1* 11/2016 Convertino ......... G06F 16/2358

OTHER PUBLICATIONS

Felden, Carsten, "Integrating Structured and Unstructured Data in a Business Intelligence System," Language@Internet, vol. 3, Article 5, 2006, 13 pages.

Zhang, Zhiyuan et al., "Iterative cohort analysis and exploration," Information Visualization, vol. 14, No. 4, Jan. 2014, 19 pages.

* cited by examiner

SYSTEMATIC ITERATIVE ANALYSIS OF UNSTRUCTURED DATA FILES

TECHNICAL FIELD

The examples relate generally to analyzing unstructured data, and in particular to the systematic iterative analysis of unstructured data files.

BACKGROUND

Files containing unstructured data are sometimes analyzed by file processing modules in order to glean information about the files. The information may be extracted from the content contained in the files, and/or from the metadata associated with the files. Different file processing modules may be used to glean different types of information, and over time, newer versions of a file processing module may be implemented to correct problems in a previous version of the file processing module, or to enhance the functionality of the file processing modules.

SUMMARY

The examples relate to mechanisms for the systematic iterative analysis of unstructured data files. The examples initiate file processing modules, referred to herein as handlers, each of which may analyze one or more files that contain unstructured data. The handlers generate results in response to analyzing the files. For at least some of the analyzed files, analysis information is maintained that includes a file identifier that identifies the file, a handler identifier that identifies the handler that analyzed the file, and results or a reference to results of the analysis of the respective file by the first handler. The analysis information is stored in a data structure. The analysis information comprises a record of what files have been analyzed by which handlers, and the results of such analyses that may be used subsequently, for, by way of non-limiting example, querying the results of the analyses.

In one example a method is provided. The method includes initiating, by a computing device comprising a processing device, a first handler to analyze a plurality of files. The method further includes storing, in a data structure, information about each respective file of the plurality of files analyzed by the first handler, the information including: a file identifier that identifies the respective file, a handler identifier that identifies the first handler, and results or a reference to results of an analysis of the respective file by the first handler.

In another example a computing device is provided. The computing device includes a memory and a processor device coupled to the memory. The processor device is to initiate a first handler to analyze a plurality of files. The processor device is further to store, in a data structure, information about each respective file of the plurality of files analyzed by the first handler, the information including: a file identifier that identifies the respective file, a handler identifier that identifies the first handler, and results or a reference to results of an analysis of the respective file by the first handler.

In another example a computer program product stored on a non-transitory computer-readable storage medium is provided. The computer program product includes instructions to cause a processor device to initiate a first handler to analyze a plurality of files. The instructions further to cause the processor device to store, in a data structure, information about each respective file of the plurality of files analyzed by the first handler, the information including: a file identifier that identifies the respective file, a handler identifier that identifies the first handler, and results or a reference to results of an analysis of the respective file by the first handler.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
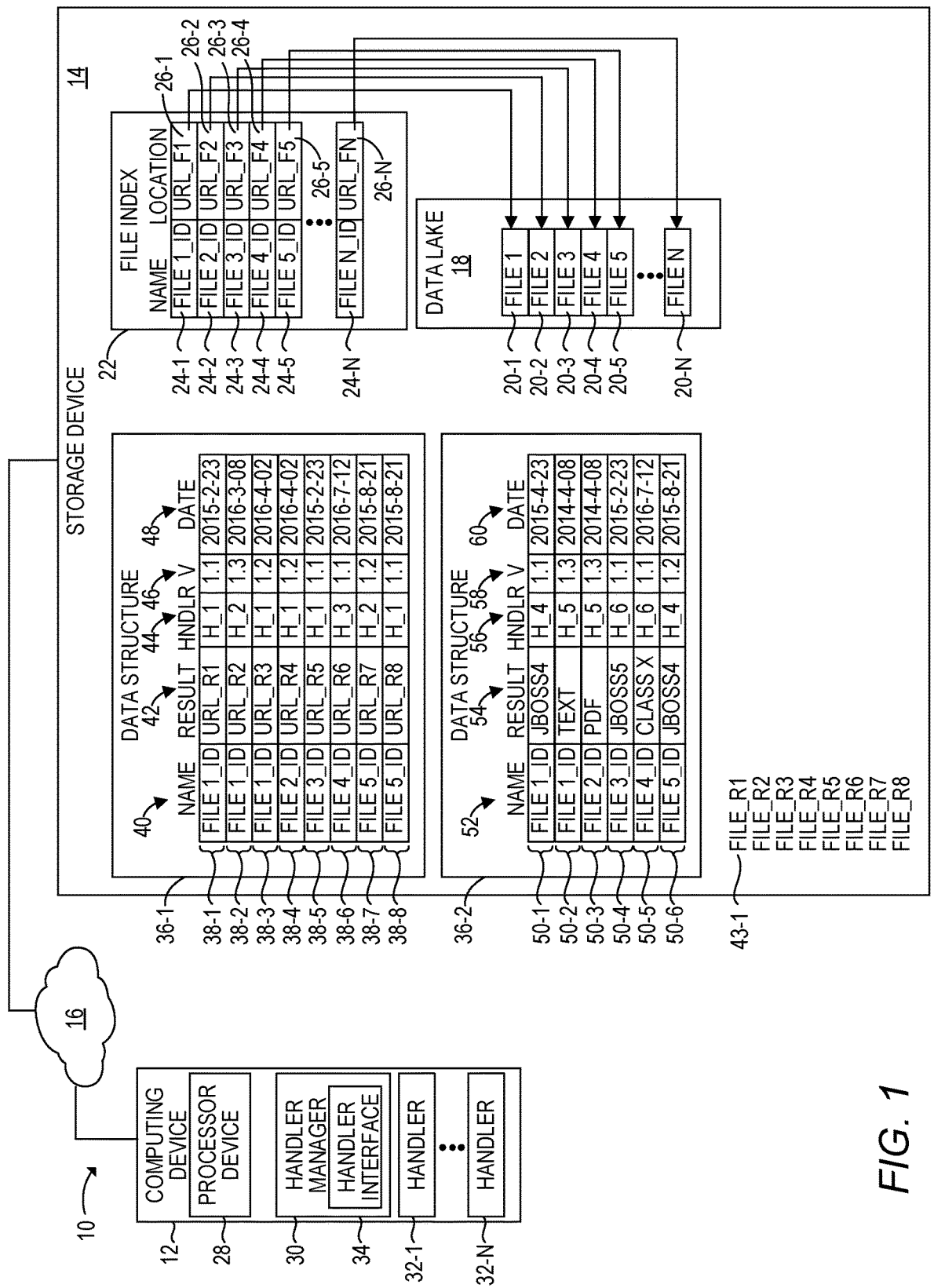
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first handler" and "second handler," and does not imply a priority, a type, an importance, or other attribute, unless otherwise stated herein. As used herein and in the claims, the articles "a" and "an" in reference to an element refers to "one or more" of the element unless otherwise explicitly specified.

Manufacturers of computing system components, such as operating systems, database systems, middleware systems, application programs, and the like often seek information from customers to aid the manufacturers in resolving issues encountered by the customers. A manufacturer may, for example, in order to resolve a problem, request that the customer provide certain configuration files, log files, or other types of files because such information may be useful in determining an origination of the problem. Because a problem that occurs with one customer is often encountered by other customers, such files may be stored for subsequent analysis purposes to more rapidly identify a solution to a problem encountered by a customer in the future.

After the manufacturer receives the files, the files are typically analyzed by one or more file processing modules, referred to herein as handlers, that are configured to analyze unstructured data files, glean information about the files, and generate results based on the analysis. The phrase "unstructured data" as used herein refers to information that is not organized in a pre-defined manner. The results may include content of the files that is extracted during the analysis, and/or may include some of the metadata associated with the files. The phrase "metadata" as used herein refers to information that describes characteristics of the file, such as, by way of non-limiting example, a file name, a file type, ownership, length, and the like. The particular metadata maintained about a file may depend in part on the type of file, the file system, and other factors. The metadata may be stored separately from the file, or may be stored in conjunction with the file, such as in a header. However, the metadata is separate from the actual contents of the file.

The results created by a handler may be maintained in a data structure or a file. Different handlers may be used to glean different types of information, and over time, newer versions of a handler may be implemented to correct problems in a previous version of the handler, or to enhance the functionality of the handlers.

Because different handlers analyze files for different purposes, and because newer versions of handlers may be implemented over time, it would be beneficial to maintain information that identifies which handler generated which results. This would allow, for example, results to be filtered based on particular handlers, and would allow a handler to determine that it had already processed a file previously, which eliminates redundant processing. The examples relate to mechanisms for the systematic iterative analysis of unstructured data files. The examples initiate handlers, each of which may analyze one or more files that contain unstructured data. The handlers generate results in response to analyzing the files. For at least some of the analyzed files, analysis information is maintained that includes a file identifier that identifies the file, a handler identifier that identifies the handler that analyzed the file, and results or a reference to results of the analysis of the respective file by the first handler. The analysis information is stored in a data structure. The analysis information comprises a record of what files have been analyzed by which handlers, and the results of such analyses that may be used subsequently, for, by way of non-limiting example, querying the results of the analyses. Among other advantages, the examples allow queries to be initiated against the results of handlers based on those of particular handlers.

FIG. 1 is a block diagram of an environment 10 in which examples may be practiced. The environment 10 includes a computing device 12 that includes, or is communicatively coupled to, a storage device 14. In some examples, the computing device 12 may be communicatively coupled to the storage device 14 via a network 16. The storage device 14 contains a data lake 18 which comprises a collection of a plurality of files 20-1-20-N (generally, files 20). The files 20 contain data, and the data may be unstructured data, such that the data comprises information that is not organized in a pre-defined manner. The files 20 may have any origination. However, in one example, the files 20 may be files provided over a period of time by customers to a manufacturer of a software product. In particular, the files 20 may be provided by respective customers in conjunction with a problem resolution request to resolve a problem encountered by the respective customers. In some examples, the files 20 may be one or more of configuration files, output files of an application program or operating system component, logfiles, or any other file either requested from the customer or that the customer felt may be of use in resolving the problem. Note that the data lake 18 may grow over time, and there may be thousands or even millions of files 20.

In some examples, the storage device 14 also includes a file index 22 that includes a plurality of file identifiers 24-1-24-N, each of which corresponds to one of the files 20, and corresponding location identifiers 26-1-26-N that identify the locations of the corresponding files 20. The file index 22 may be maintained in conjunction with the files 20, such that the file index 22 is updated each time a new file 20 is added to the data lake 18.

The computing device 12 includes a processor device 28, and a handler manager 30 that interfaces with one or more handlers 32-1-32-N (generally, handlers 32) via a handler interface 34. The handler interface 34 may comprise, for example, an application programming interface (API) or another inter-process communications mechanism that facilitates the exchange of information between the handler manager 30 and the handlers 32. In some examples, one or more of the handlers 32 may be "plug-in" modules that are independent codebases from the handler manager 30, and that are unknown to the handler manager 30 until the first time the handlers 32 inform the handler manager 30 about the existence of the respective handlers 32. Because the handler manager 30 is a component of the computing device 12, functionality implemented by the handler manager 30 may be attributed to the computing device 12 generally. Moreover, in examples where the handler manager 30 comprises software instructions that program the processor device 28 to carry out functionality discussed herein, functionality implemented by the handler manager 30 may be attributed herein to the processor device 28.

The communications and control between the handler manager 30 and the handlers 32 may be implemented in any number of different ways, but in one example, each handler 32 may expose a method that may be invoked by the handler manager 30 that identifies the types of files that can be processed by the respective handler 32. As an example, a handler 32-1 may indicate that it is capable of processing files 20 of type "jboss5_server_log", "jboss5_boot_log", or "any_text", or "netstat_output". In this example, the handler manager 30 may then send files 20 that have been previously classified as the particular type, or types, to the handler 32-1. The handler 32-1 may process each such file 20 and generate a results file 43-1, or, alternatively, may return the results to the handler manager 30 which generates the results file 43-1.

In another example, the handler manager 30 may invoke a method of the handler 32-1 and provide the method with descriptive data about a file 20, such as a type of the file 20, which may have been determined by one or more other handlers 32, for example. The handler 32-1 may return a TRUE or FALSE value to indicate whether or not the handler 32-1 can process the file 20 based on the descriptive data about the file 20. If the handler 32-1 returns a TRUE value, the handler manager 30 may pass a reference to the file 20 for processing. The handler 32-1 may process each such file 20 and generate the results file 43-1, or, alternatively, may return the results to the handler manager 30 which generates the results file 43-1.

The handler manager 30 may learn of handlers 32 in any of a number of different ways. In one example, as a new handler 32 is added to the environment 10, a data structure, such as a configuration file or a database structure is updated to include a reference to the new handler 32. In another example, the handler manager 30 may access a predetermined directory in which handlers 32 are stored. New handlers 32 may be added to the predetermined directory where they will be discovered by the handler manager 30 the next time the handler manager 30 accesses the predetermined directory, which may be done periodically for example.

Among other advantages, the disclosed architecture thus allows new handlers 32 to be generated that can analyze the files 20 to glean newly desired information, or existing handlers 32 to be updated, independently of the handler manager 30, and without modification to the handler manager 30.

Each handler 32 analyzes one or more of the files 20 in the data lake 18. Each handler 32 may generate corresponding results based on the analysis. The results may include, by way of non-limiting example, portions of the content of the files 20. For example, a handler 32 may be configured to extract, from files 20 that have a certain characteristic, certain information maintained in the files 20. In other examples, the results may be a classification result that classifies one or more of the analyzed files 20 based on one or more attributes of the respective files 20. For example, a handler 32 may access each file 20 that is of a "text" type, analyze the contents of the file 20, and then determine that one or more of the files 20 is a particular type of logfile, such as a logfile generated by a particular software application. The handler 32 may then generate a classification result that classifies the file 20 as a logfile of the particular software application.

In some examples, results of the analysis of the files 20 by the handlers 32 may be stored in one or more data structures 36-1, 36-2. The data structures 36-1, 36-2 maintain analysis information regarding the iterative analysis of the files 20 by handlers 32. In one example, the data structure 36-1 maintains the results, or references to results, of handlers 32 that extract information from analyzed files 20. The data structure 36-1 may have any desirable organization, however, in one example, the data structure 36-1 may maintain information in a plurality of entries 38-1-38-8 (generally, entries 38), wherein each entry 38 corresponds to an analysis performed by one of the handlers 32. Each entry 38 may include a file ID 40 that identifies the file 20 that corresponds to the respective entry 38. Each entry 38 may also include a result 42 that contains the results, or a reference to the results, of the analysis of the respective file 20 by the handler 32. The entries 38 may also include a handler ID 44 that identifies the particular handler 32 that analyzed the corresponding file 20. The entries 38 may also include a handler version ID 46 that identifies a particular version of the handler 32 that analyzed the corresponding file 20. The entries 38 may also include a date 48 that identifies the date that the handler 32 analyzed the corresponding file 20.

As an example, the entry 38-1 has a file ID 40 that identifies the file 20-1 (FILE1_ID). The result 42 of the entry 38-1 contains a reference URL_R1 that refers to a result file 43-1 entitled FILE_R1. The reference URL_R1 may comprise, for example, a uniform resource locator (URL) or a uniform resource identifier (URI), or any other mechanism for identifying the location of the result file FILE_R1. The result file FILE_R1 contains the results of the analysis of the file 20-1 by the respective handler 32. The handler ID 44 of the entry 38-1 identifies a handler 32 (H_1) that processed the file 20-1, and that generated the results stored in the result file FILE_R1. The handler version ID 46 of the entry 38-1 indicates the version (1.1) of the handler 32 (H_1) that analyzed the file 20-1. The date 48 of the entry 38-1 indicates that the handler 32 (H_1) analyzed the file 20-1 on Feb. 23, 2015.

Entries 38-2-38-8 contain similar information. Note, for example, that the entry 38-3 indicates that a version 1.2 of the handler 32 (H_1) has also analyzed the file 20-1, and that the result 42 (URL_R3) refers to a result file FILE_R3 as containing the results of the analysis by the handler 32 (H_1).

Some handlers 32 generate classification results that classify a file 20 based on one or more attributes of the file 20. The attributes may be metadata associated with the file 20, or may be based on the content of the file 20, or a combination of metadata and the contents of the file 20. In some examples classification results may be maintained in the data structure 36-2 separately from the data structure 36-1. The data structure 36-2 contains a plurality of entries 50-1-50-6 (generally, entries 50), wherein each entry 50 corresponds to an analysis performed by one of the handlers 32 that generates classification results. Each entry 50 may include a file ID 52 that identifies the file 20 that corresponds to the respective entry 50. The entry 50 may also include a result 54, such as a classification result, of the analysis of the respective file 20 by the handler 32. The entry 50 may also include a handler ID 56 that identifies the particular handler 32 that analyzed the corresponding file 20. The entries 50 may also include a handler version ID 58 that identifies a particular version of the handler 32 that analyzed the corresponding file 20. The entries 50 may also include a date 60 that identifies the date that the handler 32 analyzed the corresponding file 20.

As an example, the result 54 of the entry 50-1 indicates that the file 20-1 has been classified as a JBOSS4 file. The handler ID 56 of the entry 50-1 indicates that the handler 32 (H_4) analyzed the file 20-1. The handler version ID 58 of the entry 50-1 indicates that version 1.1 of the handler 32 (H_4) analyzed the file 20-1. The date 60 of the entry 50-1 indicates that the handler 32 (H_4) analyzed the file 20-1 on Apr. 23, 2015.

As another example, the result 54 of the entry 50-2 indicates that the file 20-1 has also been classified as a TEXT file. The handler ID 56 of the entry 50-2 indicates that the handler 32 (H_5) analyzed the file 20-1. The handler version ID 58 of the entry 50-2 indicates that version 1.3 of the handler 32 (H_5) analyzed the file 20-1. The date 60 of the entry 50-2 indicates that the handler H_5 analyzed the file 20-1 on Apr. 8, 2014.

Figure 2:
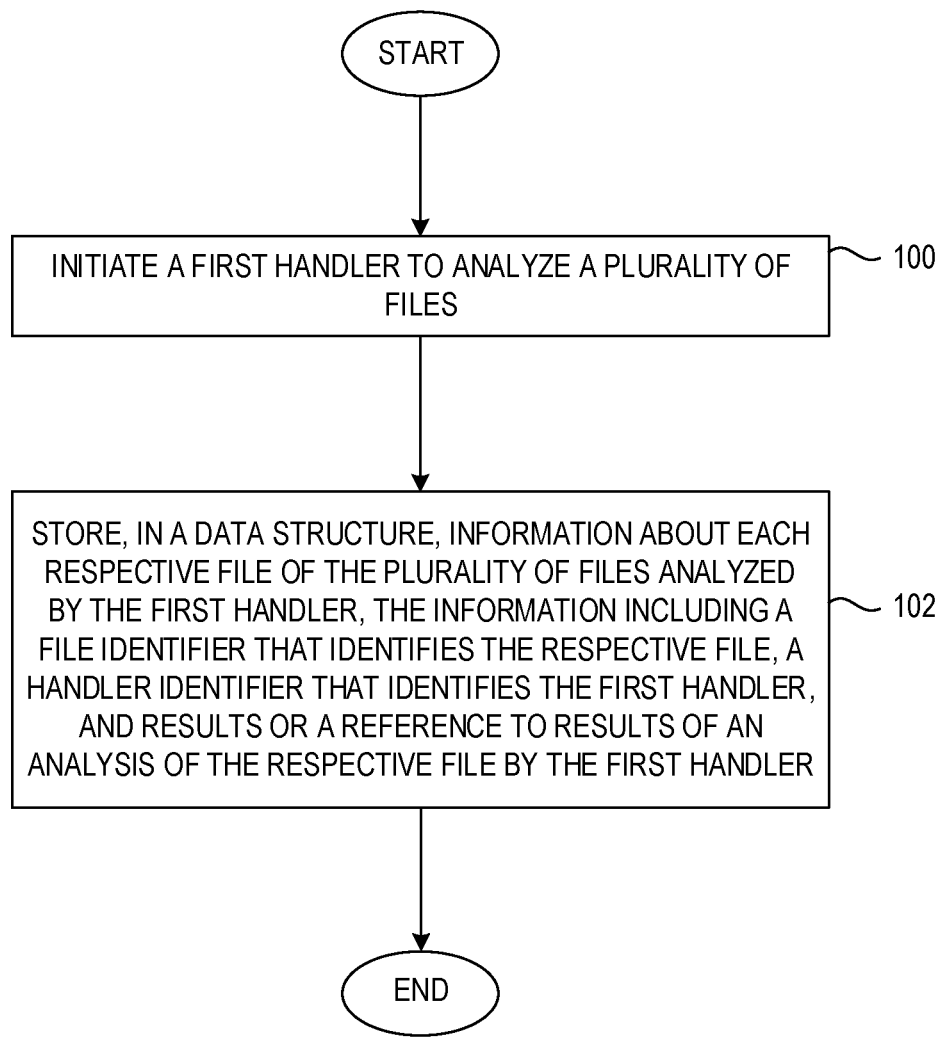
FIG. 2 is a flowchart of a method for iteratively analyzing unstructured data files according to one example.

FIG. 2 is a flowchart of a method for the iterative analysis of unstructured data files. The computing device 12 initiates a first handler 32 to analyze the plurality of files 20 (FIG. 2, step 100). The computing device 12 stores, in a data structure 36, information about each respective file 20 of the plurality of files 20 analyzed by the first handler 32. The information includes a file ID 40, 52 that identifies the respective file 20 and a handler ID 44, 56 that identifies the first handler. The information also includes the results, or a reference to results, of the analysis of the respective file 20 by the first handler 32 (FIG. 2, step 102). This process may be repeated, over time, for thousands or millions of files 20 by hundreds or thousands of handlers 32. For each such analysis, information similar to that described above may be stored in a data structure 36, thereby generating a history of the identity of which handlers 32 analyzed which files 20, and what the results of the analyses were.

Figure 3:
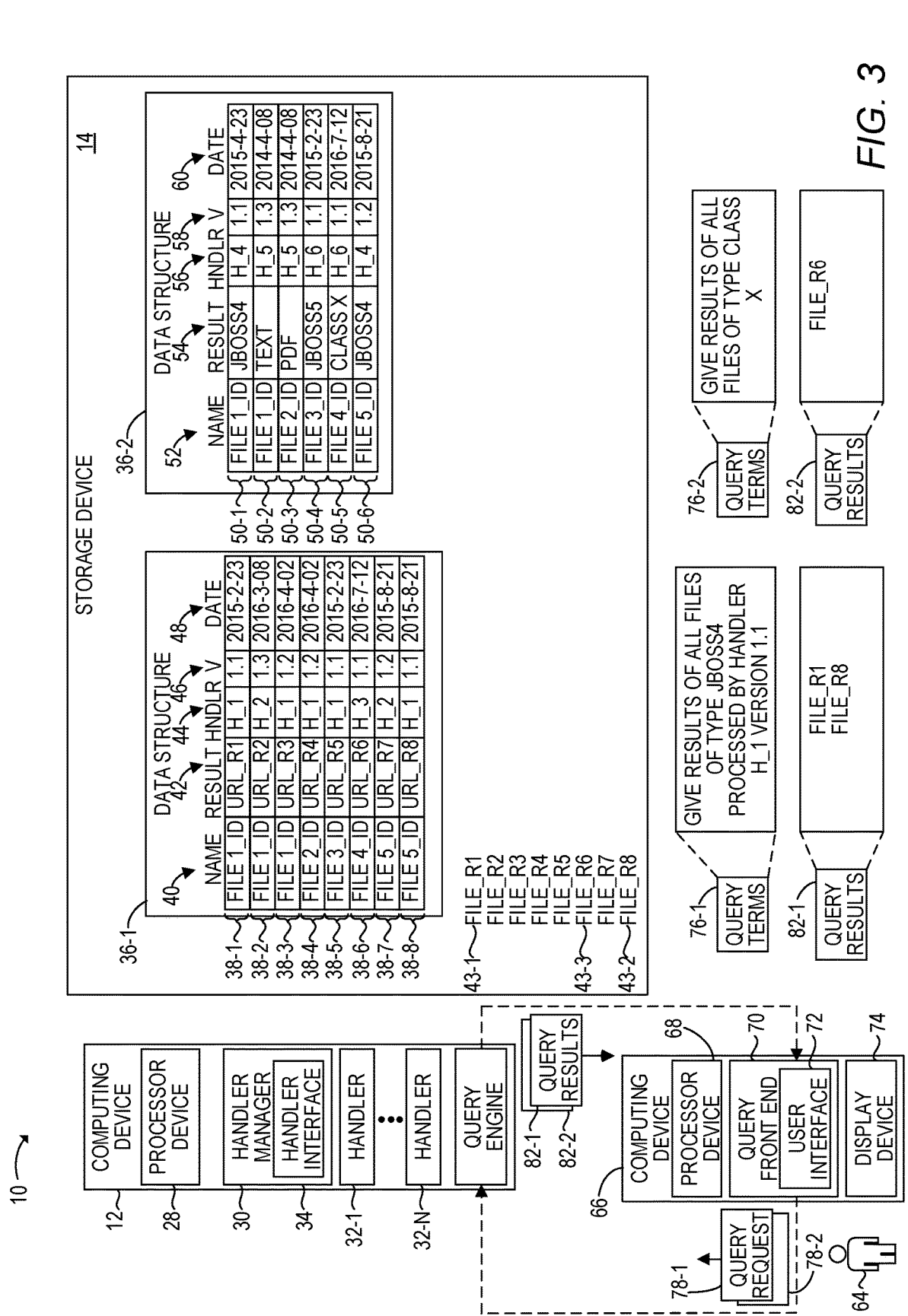
FIG. 3 is a block diagram of the environment illustrated in FIG. 1 that illustrates how data structures illustrated in FIG. 1 may be utilized according to one example.

FIG. 3 is a block diagram of the environment 10 that illustrates how the analysis information contained in the data structures 36 may be subsequently utilized, according to one example. In particular, FIG. 3 will be discussed in the context of searching, or querying, the results of the handlers 32. Certain elements illustrated in FIG. 1 have been omitted from FIG. 3 solely for space considerations. In this example, a user 64 accesses a computing device 66 which includes a processor device 68 and a query front end 70. The query front end 70 may comprise, for example, a web application that presents a user interface 72 on a display device 74. The user interface 72 may allow the user 64 to enter certain criteria for searching the results 42, 54 of the handlers 32 based on analysis information maintained in the data structures 36.

In a first example, the user 64 enters query terms 76-1, which requests the results of all files 20 of type "JBOSS4" that were processed by version 1.1 of the handler 32 (H_1). Based on these query terms, the query front end 70 generates a query request 78, and sends the query request 78 to a query engine 80. For purposes of illustration the query engine 80 is illustrated as being a component of the computing device 12, however, in other examples the query engine 80 may be a component of some other computing device.

The query engine 80 receives the query request 78 and accesses the data structure 36-2 to determine which files 20 have been classified as type "JBOSS4". Based on the results 54 of the entries 50-1 and 50-6, the query engine 80 determines that the file 20-1 (identified by the file ID 52 of the entry 50-1) and the file 20-5 (identified by the file ID 52 of the entry 50-6) have been classified as type "JBOSS4". The query engine 80 accesses the data structure 36-1 and determines, based on the handler ID 44 and the handler version ID 46 of the entry 38-1, that the file 20-1 was analyzed by version 1.1 of the handler 32 (H_1), and that, based on the result 42 of the entry 38-1, the results are stored in the result file 43-1 entitled FILE_R1. The query engine 80 accesses the data structure 36-1 and also determines, based on the handler ID 44 and the handler version ID 46 of the entry 38-8, that the file 20-5 was analyzed by version 1.1 of the handler 32 (H_1), and that, based on the result 42 of the entry 38-8, the results are stored in a result file 43-2 entitled FILE_R8. The query engine 80 generates query results 82-1 that include the contents of the results files 43-1 and 43-2, or references to the results files 43-1 and 43-2, and sends the query results 82-1 to the computing device 66.

The query front end 70 receives the query results 82-1, and may display the contents of the results files 43-1 and 43-2 on the display device 74.

In another example, the user 64 enters query terms 76-2 in the user interface 72. The query terms 76-2 request the results of all files 20 of type "CLASS X". Based these query terms, the query front end 70 generates a query request 78-2, and sends the query request 78-2 to the query engine 80. The query engine 80 receives the query request 78-2 and accesses the data structure 36-2 to determine which files 20 have been classified as type "CLASS X". Based on the result 54 of the entry 50-5, the query engine 80 determines that the file 20-4 (identified by the file ID 52 of the entry 50-5) has been classified as type "CLASS X". The query engine 80 accesses the data structure 36-1 and determines, based on the entry 38-6, that the file 20-4 was analyzed by the handler 32 (H_3), and that the results are stored in the result file 43-3 entitled FILE_R6. The query engine 80 generates query results 82-2 that include the contents of the results file 43-3, or references to the results file 43-3, and sends the query results 82-2 to the computing device 66. The query front end 70 receives the query results 82-2, and may display the contents of the result file 43-3 on the display device 74.

While solely for purposes of illustration the use of the data structures 36 is discussed in the context of querying, the data structures 36 may be utilized for any number of different purposes, including, by way of non-limiting example, statistical analysis of the files 20 in the data lake 18, such as correlations between the results 42 for files 20 with a specified result 54 to identify and validate likely causes of customer issues. In another example, the data structures 36 may be analyzed by an unsupervised machine learning algorithm to classify types of customer systems. In another example, the data structures 36 could be analyzed by a supervised machine learning algorithm to build a data module suitable for identifying issues in newly uploaded customer data files.

Figure 4:
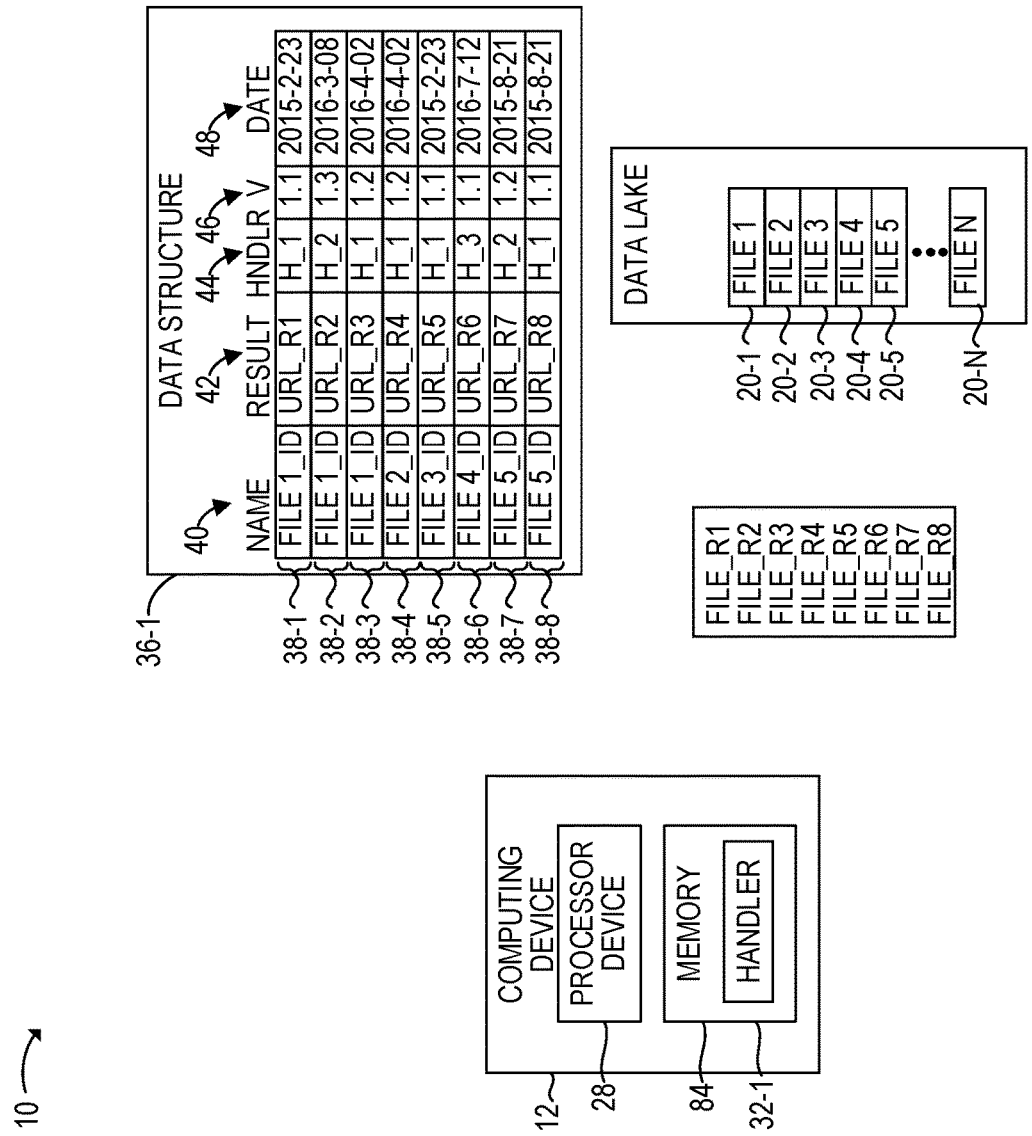
FIG. 4 is a simplified block diagram of the environment illustrated in FIG. 1.

FIG. 4 is a simplified block diagram of the environment 10 illustrated in FIG. 1. The computing device 12 includes the processor device 28 and a memory 84. The memory 84 includes the first handler 32-1. The processing device 28 initiates the first handler 32-1 to analyze the plurality of files 20. The processor device 28 stores, in the data structure 36-1, information about each respective file 20 of the plurality of files 20 analyzed by the first handler 32-1. The information includes a file ID 40 that identifies the respective file 20, a handler ID 44 that identifies the first handler 32-1, and results or a reference to results 42 of the analysis of the respective file 20 by the first handler 32-1.

Figure 5:
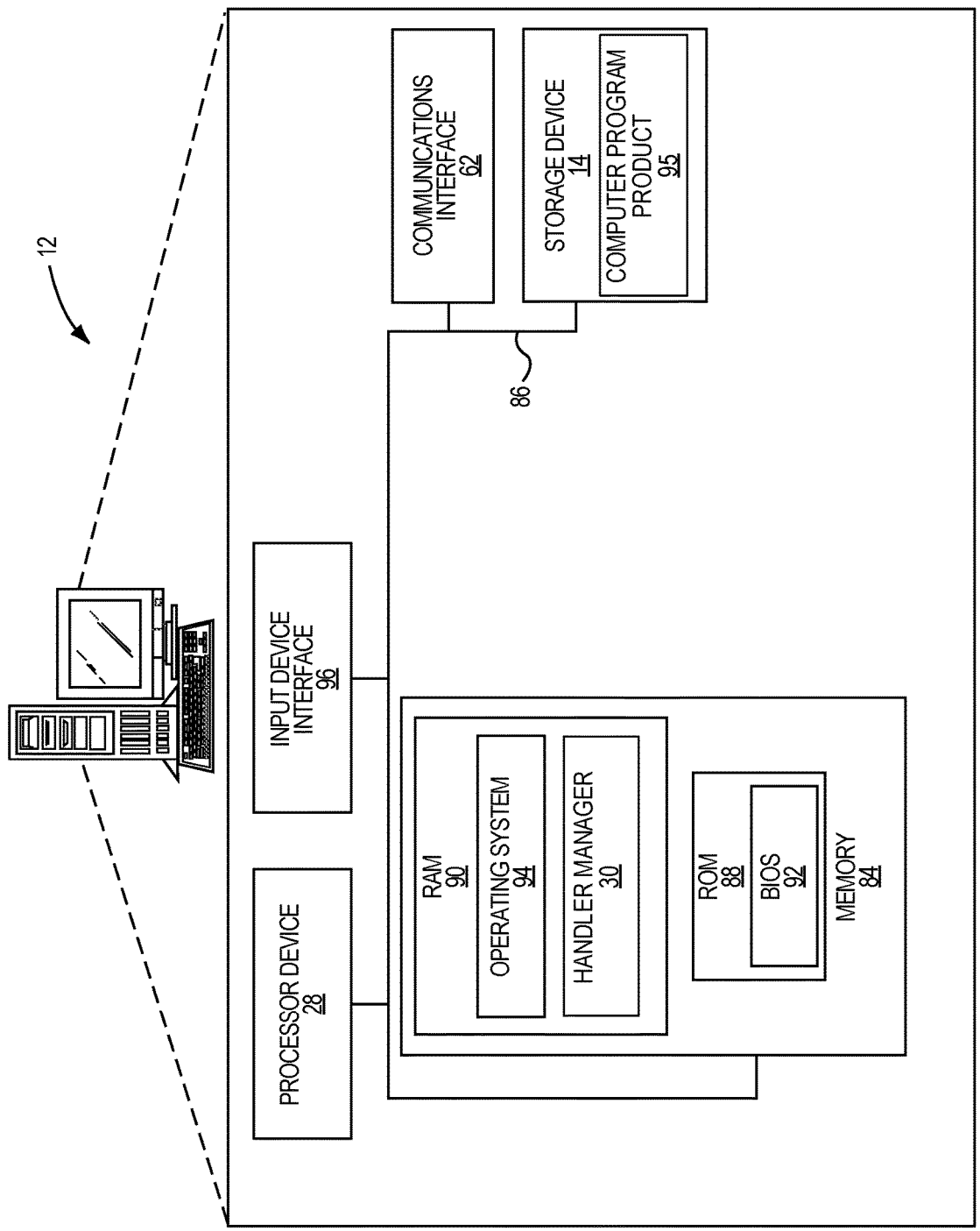
FIG. 5 is a block diagram of a computing device according to one example.

FIG. 5 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 28, the memory 84, and a system bus 86. The system bus 86 provides an interface for system components including, but not limited to, the memory 84 and the processor device 28. The processor device 28 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The memory 84 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help to transfer information between elements within the computing device 12. The volatile memory 90 may also include a high-speed RAM, such as static RAM, for caching data.

The computing device 12 may further include or be coupled to a non-transitory computer-readable storage medium such as the storage device 14, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 14 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 14 and in the volatile memory 90, including an operating system 94 and one or more program modules, such as the handler manager 30, which may implement the functionality described herein in whole or in part. It is to be appreciated that the examples can be implemented with various commercially available operating systems 94 or combinations of operating systems 94.

All or a portion of the examples may be implemented as a computer program product 95 stored on a transitory or non-transitory computer-usable or computer-readable storage medium, such as the storage device 14, which includes complex programming instructions, such as complex computer-readable program code, to cause the processor device 28 to carry out the steps described herein. Thus, the computer-readable program code can comprise software instructions for implementing the functionality of the examples described herein when executed on the processor device 28. The processor device 28, in conjunction with the handler manager 30 in the volatile memory 90, may serve as a controller, or control system, for the computing device 12 that is to implement the functionality described herein.

An operator, such as the user 64, may also be able to enter one or more configuration commands through a keyboard (not illustrated), a pointing device such as a mouse (not illustrated), or a touch-sensitive surface such as the display device 74. Such input devices may be connected to the processor device 28 through an input device interface 96 that is coupled to the system bus 86 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 62 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   determining, by a handler manager executing on a computing device comprising a processor device, the handler manager being defined in a first codebase, that a first handler defined in a second codebase and that was previously unknown to the handler manager exists, the first handler being one of a plurality of handlers, each handler being configured to analyze certain files in a collection of files based on a type of files, each file in the collection of files being of a particular type of a plurality of different types of files;
   initiating, by the handler manager, the first handler;
   obtaining, by the handler manager from the first handler via an inter-process communications mechanism, information that identifies a first type of file that the first handler is configured to analyze;
   selecting, by the handler manager, a plurality of files of the collection of files based on each file in the plurality of files being the first type of file;
   iteratively providing, by the handler manager to the first handler, each file in the plurality of files for analysis;
   storing, by the handler manager in a data structure, information about each respective file of the plurality of files analyzed by the first handler, the information including:
      a file identifier that identifies the respective file;
      a handler identifier that identifies the first handler;
      a version identifier that identifies a version of the first handler; and
      results or a reference to results of an analysis of the respective file by the first handler;
   receiving, via a user interface, a query request that includes the handler identifier that identifies the first handler and the version of the first handler;
   in response to the query request, analyzing the data structure to identify the plurality of files as files that have been analyzed by the version of the first handler, wherein analyzing the data structure comprises:
      determining that at least one file of the plurality of files was analyzed by the version of the first handler; and
      accessing the data structure to identify at least one results file containing results of an analysis of the at least one file by the version of the first handler; and
   in response to the query request, presenting, on a display device, query results that identify each file in the plurality of files and at least a portion of the results of the analysis of the first handler for each file in the plurality of files from the at least one results file, the portion including contents related to the analysis of the at least one file.

2. The method of claim 1 further comprising:
   initiating a second handler to analyze the plurality of files, the second handler being a different handler than the first handler; and
   storing, in the data structure, information about each respective file of the plurality of files analyzed by the second handler, the information including:
      a file identifier that identifies the respective file;
      a unique identifier that identifies the second handler; and
      results or a reference to results of an analysis of the respective file by the second handler.

3. The method of claim 1 wherein the first handler analyzes contents of each respective file of the plurality of files, and wherein the results of the analysis by the first handler include at least some of the contents of the respective file.

4. The method of claim 1 wherein the first handler analyzes each respective file to generate a classification result that classifies the respective file based on an attribute of the respective file, and wherein the results of the analysis by the first handler comprise the classification result.

5. The method of claim 1 further comprising:
   receiving, from the first handler, the results of the analysis;
   storing the results of the analysis;
   generating the reference to the results of the analysis; and
   storing the reference to the results in the data structure.

6. The method of claim 1 further comprising:
   receiving a second query request that includes a file attribute identifier that identifies a file attribute, and a handler identifier that identifies a particular handler of the plurality of handlers;
   determining, based on the data structure and on the file attribute identifier, a set of files of the collection of files that has the file attribute identified by the file attribute identifier;

determining, based on the data structure, a subset of the set of files that have been analyzed by the particular handler; and communicating, in response to the second query request, search results that identify output of the particular handler for each file in the subset of the set of files.

7. A computing device, comprising:

a memory; and a processor device coupled to the memory to:

initiate a first handler of a plurality of different handlers to analyze a plurality of files in a collection of files;

store, in a data structure, information about each respective file of the plurality of files analyzed by the first handler, the information including:

a file identifier that identifies the respective file;

a handler identifier that identifies the first handler;

a version identifier that identifies a version of the first handler; and results or a reference to results of an analysis of the respective file by the first handler;

receive, via a user interface, a query request that includes the handler identifier that identifies the first handler of the plurality of handlers;

in response to the query request, analyzing the data structure to identify the plurality of files as files that have been analyzed by the version of the first handler, wherein analyzing the data structure comprises:

determining that at least one file of the plurality of files was analyzed by the version of the first handler; and accessing the data structure to identify at least one results file containing results of an analysis of the at least one file by the version of the first handler; and in response to the query request, present, on a display device, query results that identify each file in the plurality of files and at least a portion of the results of the analysis of the first handler for each file in the plurality of files from the at least one results file, the portion including contents related to the analysis of the at least one file.

8. The computing device of claim 7 wherein the processor device is further to:

initiate a second handler to analyze the plurality of files, the second handler being a different handler than the first handler; and store, in the data structure, information about each respective file of the plurality of files analyzed by the second handler, the information including:

a file identifier that identifies the respective file;

a unique identifier that identifies the second handler; and results or a reference to results of an analysis of the respective file by the second handler.

9. The computing device of claim 7 wherein the first handler analyzes contents of each respective file of the plurality of files, and wherein the results of the analysis by the first handler include at least some of the contents of the respective file.

10. The computing device of claim 7 wherein the first handler analyzes each respective file to generate a classification result that classifies the respective file based on an attribute of the respective file, and wherein the results of the analysis by the first handler comprise the classification result.

11. The computing device of claim 7 wherein the processor device is further to:

receive a second query request that includes a file attribute identifier that identifies a file attribute, and a handler identifier that identifies a particular handler of the plurality of handlers;

determine, based on the data structure and on the file attribute identifier, a set of files of the collection of files that has the file attribute identified by the file attribute identifier;

determine, based on the data structure, a subset of the set of files that have been analyzed by the particular handler; and communicate, in response to the second query request, search results that identify output of the particular handler for each file in the subset of the set of files.

12. A method, comprising:

initiating, by a computing device comprising a processing device, over a period of time, a plurality of handlers to analyze a plurality of files, wherein each handler of the plurality of handlers analyzes a corresponding set of files, and wherein the corresponding sets of files analyzed by some handlers differ from the corresponding sets of files analyzed by other handlers, and wherein at least some of the files are analyzed by multiple handlers;

storing, for each analysis of a respective file by each handler, in a data structure, information including:

a file identifier that identifies the respective file;

a handler identifier that identifies the handler that analyzed the respective file;

a version identifier that identifies a version of the first handler; and results or a reference to results of the analysis of the respective file by the handler;

receiving, via a user interface, a query request that includes the handler identifier that identifies a first handler of the plurality of handlers;

in response to the query request, identifying, based on the data structure, the corresponding set of files analyzed by the version of the first handler, wherein analyzing the data structure comprises:

determining that at least one file of the plurality of files was analyzed by the version of the first handler; and accessing the data structure to identify at least one results file containing results of an analysis of the at least one file by the version of the first handler; and in response to the query request, presenting, on a display device, query results that identify each file in the corresponding set of files analyzed by the first handler and at least a portion of the results of the analysis for each file in the corresponding set of files analyzed by the first handler from the at least one results file, the portion including contents related to the analysis of the at least one file.

\* \* \* \* \*